March 2, 1965    H. W. TODD    3,171,808
APPARATUS FOR EXTRACTING FRESH WATER FROM OCEAN SALT WATER
Filed Nov. 30, 1960

INVENTOR
Harry W. Todd

BY
Mason, Fenwick & Lawrence
ATTORNEYS

3,171,808
APPARATUS FOR EXTRACTING FRESH WATER FROM OCEAN SALT WATER
Harry W. Todd, 8069 Vista Drive, La Mesa, Calif.
Filed Nov. 30, 1960, Ser. No. 72,671
3 Claims. (Cl. 210—321)

The present invention relates in general to processes and apparatus for extracting fresh water from ocean salt water, and more particularly to processes and apparatus which take advantage of the reversible semipermeable nature of certain osmotic membranes which operate in the presence of strong electrolytes to extract fresh water from ocean salt water.

In recent years, a rapid increase in industrial activity and in population has combined to produce a drastic increase in the demand for fresh water. Large amounts of capital have been expended to increase the utilization of natural fresh water resources. However, it is anticipated that completely efficient utilization of conventional sources of water will not be adequate to meet the demands of the more highly industrialized areas. In realization of this, extensive research has been carried on in an effort to develop methods to demineralize ocean water at a cost competitive with untreated water that is less readily available to many areas. The present invention is directed to a method of demineralizing ocean water in a manner which will provide fresh water at a reasonable cost, and thereby provide fresh water from this substantially unlimited source of water on an economically competitive scale.

An object of the present invention is the provision of a novel method and apparatus for extracting fresh water from ocean salt water based on the phenomenon of dialysis.

Another object of the present invention is the provision of a novel method and apparatus for extracting fresh water from ocean salt water by separation of salts from water at submerged sites in the ocean as a result of their unequal diffusion rates through semipermeable osmotic membranes.

Another object of the present invention is the provision of a novel method and apparatus for extracting fresh water from ocean salt water by separation of salts from water as a result of their unequal diffusion rates through semipermeable osmotic membranes, wherein a pressure drop is maintained across the membranes by the natural hydrostatic pressure of sea water to maintain water flow from the salt water side to the fresh water side.

Another object of the present invention is the provision of a novel method and apparatus of extracting fresh water from ocean salt water by disposing extraction cells covered with membranes having a high degree of salt rejection at levels in ocean salt water such that the natural hydrostatic pressure of salt water maintains a pressure differential across the membranes maintaining the flow of water from the high concentration side to the low concentration side.

Other objects, advantages and capabilities of the present invention will become apparent from the following detailed description, taken in conjunction with the accompanying drawing illustrating one exemplary embodiment of the invention.

Figure 1:
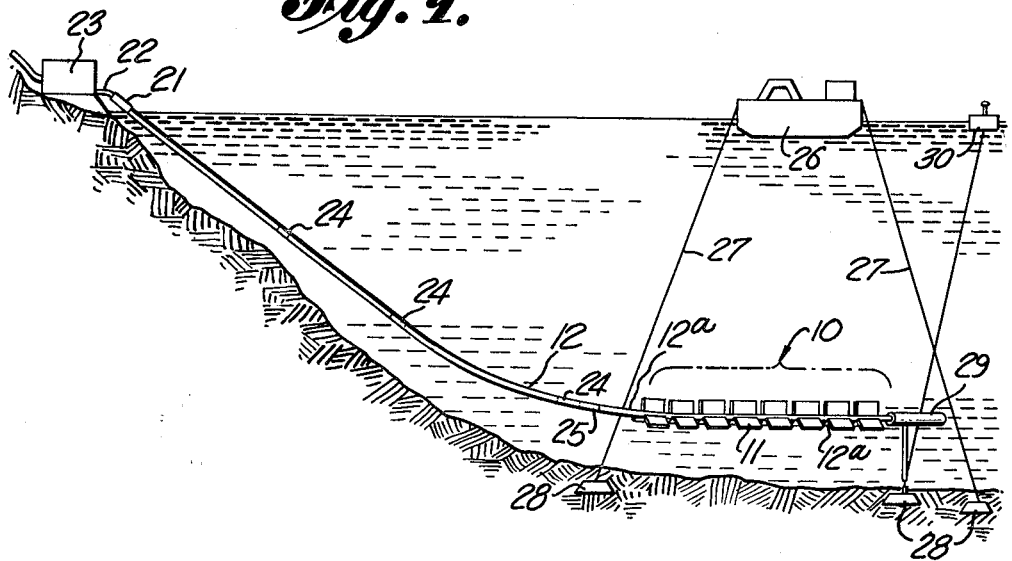
FIGURE 1 is a diagrammatic view of an exemplary installation for extracting fresh water from ocean salt water in accordance with the present invention.

The method of extracting fresh water from ocean salt water which is the subject of this invention is based upon the phenomenon of dialysis, which in general relates to the separation of solute such as salts from solvent such as water as a result of their unequal diffusion rates through a semipermeable osmotic membrane. If an aqueous solution is separated from fresh water, or a similar aqueous solution of low concentration, by an osmotic membrane, it has been observed that spontaneous flow occurs from the side of least concentration to that of greatest concentration. Counter-flow of solute is blocked by the membrane. That is to say, the membrane displays a directional permeability, commonly termed "semipermeability." The flow or diffusion pressures across the membrane is dependent upon the relative concentrations of the solutions; the greater the difference in concentration the greater the osmotic pressure. Flow of solvent from the low concentration side of the membrane to the high concentration side may be reversed by applying a pressure to the high concentration side that is in excess of the natural osmotic pressure.

For some time, a wide variety of synthetic organic polymer membranes have been employed by industry to "sieve out" large organic molecules from aqueous solutions by taking advantage of this reversible semipermeability. Semipermeable membranes which would be suitable for use in strong electrolytes such as sea water are not as common, however, because water molecules are about the same size as the salt ions to be removed, so that simple "sieving out" is ineffective.

Certain membranes do exist, however, that can effect a high degree of "salt rejection." One example of this class of membranes is cellulose acetate which, according to the theory of E.J. Breton published in the 1957 report entitled "Water and Ion Flow Through Imperfect Osmotic Membranes," Office of Saline Water, Research & Development Report No. 16, owes its semipermeability to a high degree of crystallinity or strong interpolymer bonding. Membranes made up of loosely bound polymeric chains allow ready diffusion of both solute and solvent between the constantly fluctuating, widely spaced chains of organic molecules. However, the polymer chains in cellulose acetate that are not tightly bound lie closer together than they do in less crystalline membranes. This permits water to fill most of the voids between the loosely bound chains and unite these chains by hydrogen bond cross linkage. Ions and molecules that are able to combine with the polymer chains through hydrogen bonding can pass through the "water bound" areas by alignment diffusion. Those ions that cannot combine with the polymer chains in this fashion, such as the dissolved salts in sea water, can diffuse through the membranes only in areas that are neither strongly bound (crystalline) nor filled with "aligned" bound water. Such holes are rare in cellulose acetate, and account for its high salt rejection efficiency during solvent diffusion. Conditions of compression and lower temperatures such as may be found at oceanic depths increase this efficiency to approximately 99% at pressure of about 2500 pounds per square inch and a temperature of 10° C. or less. Cellulose acetate upon continuous exposure to salt water eventually undergoes hydrolysis and becomes a less effective semipermeable membrane. In order to reduce the frequency of replacement of the cellulose acetate membranes adversely affected by prolonged exposure, one may use cellulose acetate films which have been chemically modified to render them less subject to hydrolytic damage. An example of one chemical modification technique involves the treatment of regenerated cellulose acetate with an aqueous solution of magnesium perchlorate.

The present invention is concerned with a method and apparatus which takes advantage of the reversible, semipermeable nature of osmotic membranes that are effective in strong electrolytes to extract fresh water from ocean salt water by exerting pressure on the saline side of the membranes that is in excess of the osmotic pressure generated by fresh water and exerted on the fresh water side of the membrane in its attempt to flow through the membrane into the salt water and to preserve a pressure drop across such membranes that is in excess of osmotic pressures for fresh water-sea water concentration contrast of about 355 pounds per square inch. In order to create this pressure drop, the natural hydrostatic pressure of sea water is to be utilized by placing a closed membrane-covered, porous-wall, hollow cell structure to such a depth in the ocean that fresh water will rapidly diffuse through the membrane and porous wall to the interior of the structure. The fresh water will then be elevated through a conduit and system of valves and lift pumps to a convenient place of storage.

By this arrangement, no energy input is needed to separate the salt from the water, the natural hydrostatic pressure of the sea water being relied upon to supply the necessary pressure differential, and only fresh water will be lifted from the extraction level in the ocean. This is in contrast to other methods of salt water conversion which require an expenditure of energy for lifting the sea water comprising a mixture of portable water and unusable concentrated brine to a processing plant on the land. The present method also avoids the difficulty attendant to methods involving transportation of salt water to land processing plants of disposing of the unusable concentrated brine. In the process of the present invention, there is no disposal problem in connection with the concentrated brine, because ionic diffusion and movement of deep oceanic currents will prevent any concentration of salts. An additional advantage arises out of disposition of the membrane-covered extraction cells in the ocean depths. If the separation process were carried on with confined bodies of salt water, as in land tank installations to which the salt water is supplied, progressively increasing pressures would have to be supplied to achieve reversibility or very large volumes of water would have to be handled because as the salt concentration at the rejection membrane increased, the "back osmotic pressure" would increase. However, by disposing the extraction cells in the open ocean, concentration of salts is prevented by ionic diffusion and movement of oceanic currents.

Figure 3:
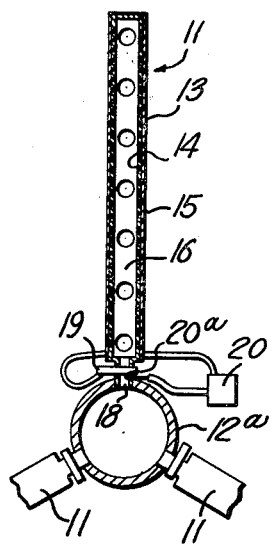
FIGURE 3 is a vertical transverse section view taken along the line 3—3 of FIGURE 2.
Figure 2:
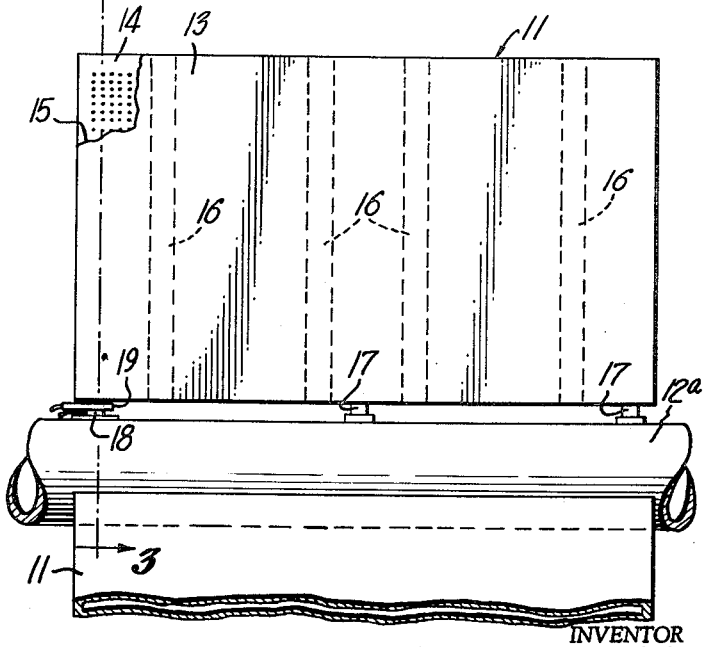
FIGURE 2 is a side elevation view of one form of extraction cell which may be employed in practicing the present invention, parts being broken away to reveal the interior construction thereof.

Referring to the drawing illustrating an exemplary embodiment of an installation for extracting fresh water from ocean salt water in accordance with the present invention, an extractor assembly 10 formed of a plurality of extractor cells 11 coupled to a collector pipe 12 will be disposed at the desired depth in the ocean. In this specific embodiment, the extractor cells 11 are in the form of hollow vane or fin-like rectangular structures supported from the collector pipe line 12, sets of a plurality of such fin-like structures radiating at a plurality of different angles from the collector pipe line 12 being arranged in series along a length of the terminal section 12a of the collector pipe line. FIGURES 2 and 3 illustrate details of an exemplary form of these cells 11, each cell in this exemplary embodiment being formed of a hollow, generally rectangular vessel 13 of highly corrosion-resistant metal having porous walls 14, as for example by providing a very large number of minute perforations in the walls 14. The walls 14 of the vessel 13 are covered throughout in this embodiment with a semipermeable osmotic membrane 15, which may, for example, be formed of modified cellulose acetate, and the vessel is internally braced by bracing walls or partitions 16 which will be perforated or otherwise designed to provide communication between the several sections of the vessel separated by the bracing walls. Each cell 11 may be rigidly supported in the desired plane radiating from the collector pipe line 12 by means of connecting rods 17 which are preferably secured to the collector pipe 12 by any conventional quick detachable connection.

Adjacent one end of each cell 11 is a drain pipe or exit pipe 18 which provides communication from the interior of the hollow vessel 13 of each cell 11 to the interior of the collector pipe section 12a for transfer of fresh water from the hollow interior of the cell 11 into the collector pipe, the drain pipe 18 being provided with a shut-off valve 19, which is preferably under control of equipment which is responsive to the residual salinity of the water exiting through the drain pipe 18 to be shut off and isolate the cell from the collector pipe section 12a when the residual salinity exceeds a prescribed limit. For example, telemetering potentiometer equipment indicated schematically at 20 and responsive to a sensor 20a interposed in the flow path through the drain pipe 18 may maintain a continuous check on the salinity of the water passing through the drain pipe 18 and be activated when the monitored salinity exceeds a prescribed limit to actuate the shut-off valve 19 to "off" position.

The interior of the hollow extractor cells 11 will be open to atmospheric pressure through the collector pipe line 12, which may be arranged in any desired number of sections in accordance with the conditions encountered at any particular installation, and is coupled, preferably through a semi-flexible joint 21, to a suitable intake conduit 22 at a shore pump station 23 or other suitable installation for distributing extracted water to storage points. Suitable lifting means for elevating the extracted water from the level of the submerged extractor assembly 10 to the shore pump station 23 will be provided in the collector pipe line 12, lifting means in this exemplary embodiment comprising a plurality of electrically driven submersible pumps 24 of well known commercially available types, for example as now used in oil production, disposed at selected points along the collector pipe line 12, and a standing valve 25 located below the lowest pump 24.

A maintenance barge 26 will be stationed over the site of the submerged extractor assembly 10 in this embodiment and is restrained in the position, for example, by sets of anchorage cables 27 extending to suitable permanent anchors 28. In one convenient embodiment, the maintenance barge 26 may be built of two separate compartmented hulls connected by a deck with the hulls disposed far enough apart and the connecting deck structure high enough above the water level so that the extractor assembly 10 can be received between the two hulls. The maintenance barge 26 will also house suitable monitoring and communication equipment for use in observation and control of the fresh water extracting installation. To facilitate elevation of the extractor assembly 10 to sea level for repair purposes, the free end of the collector pipe section 12a may be provided with conventional floatation gear 29 which may be controlled from the maintenance barge 26 when required to raise the collector pipe 12 and extractor cell assemblage to sea level. A conventional anchorage float and cable 30 may also be provided to designate the position of the submerged extractor assembly 10.

It will be apparent that with the hollow interior of the extractor cells 11 open to atmospheric pressure through the collector pipe line 12, the pressure differential existing across the membrane 15 of each cell at any particular instant will be equal to the hydrostatic head of the sea water (0.445 pound per square inch per foot of depth) minus the hydrostatic head of the fresh water in the extractor cells 11 and in the collector pipe 12 below the standing or non-return valve 25 plus the "back" osmotic pressure. For example, the pressure differential across the osmotic membrance 15 of an extractor cell at 3000 feet depth in the sea with 100 feet of fresh water below the standing valve 25 would equal 1335 p.s.i. minus (43 p.s.i. plus 355 p.s.i.) or 997 ps.i. A minimum water depth of approximately 1000 feet is necessary for this process to be effective. However, submarine canyons along many seacoast regions commonly bring depths in excess of this minimum figure to within less than ten miles of shore. With the extractor assembly 10 located at a suitable depth in the ocean, the natural hydrostatic pressure of the sea water will maintain the desired pressure differential across the osmotic membranes 15 of the extractor cells 11 to effect passage of fresh water through the membranes while rejecting the salt ions. The extracted fresh water is then withdrawn periodically through the successive sections of the collector pipe 12 by the submerged pumps 24 to deliver the extracted water to the shore pump station 23. It will be appreciated, of course, that other well known methods of lifting fluids from subsurface or submerged levels may be employed, such as gas or air-lift mechanisms of the type commercially available from oil well supply companies.

Various sensor and control devices may be employed to maintain volume and quality control of fresh water and stability of submarine assemblage under current influence. These generally will include means mounted on the submerged extractor assemblage 10 and the maintenance barge 26 to record conditions of salinity, motion, impact of aquatic life and the like.

While but one specific example of apparatus for practicing the method of the present invention has been particularly shown and described, it will be apparent that other apparatus and structures may be employed within the spirit and scope of the invention and it is desired, therefore, that only such limitations be placed thereon as are imposed by the prior art and set forth in the appended claims.

What is claimed is:

1. Apparatus for extracting fresh water from ocean salt water comprising a submarine extraction assembly including an elongated collecting pipe section and a plurality of rigid, porous walled, hollow metallic cells in the form of vanes extending radially from said collecting pipe sections, a reversible semipermeable osmotic membrance covering each of said cells and formed of a material capable of passing water therethrough by solvent diffusion while substantially preventing passage of dissolved salts in the sea water, means for disposing said extraction assembly at a sufficiently low depth in the ocean to maintain a natural hydrostatic pressure of sea water on the exterior surface of the membranes of said cells in excess of the hydrostatic head of any fresh water within said cells and collecting pipe section plus the natural osmotic pressure outwardly of the membranes resulting from differences in concentration of the solutions at the opposite surfaces of said membranes, conduit means communicating the hollow interior of said cells with the interior of said collecting pipe section, a pipe line extending from one end of said collecting pipe section to an outlet end above sea level for flow of extracted fresh water from said cells to the outlet end, lift means for lifting extracted fresh water from said collecting pipe section through said pipe line to the above surface location, and means for maintaining the interior of said cells open to substantially atmospheric pressure.

2. Apparatus for extracting fresh water from ocean salt water comprising a submarine extraction assembly including an elongated collecting pipe section and a plurality of rigid, porous walled, hollow metallic cells in the form of vanes extending radially from said collecting pipe sections and arranged in a plurality of axially spaced sets of several angularly spaced cells, a reversible semipermeable osmotic membrane covering each of said cells and formed of a material capable of passing water therethrough by solvent diffusion while substantially preventing passage of dissolved salts in the sea water, means for disposing said extraction assembly at a sufficiently low depth in the ocean to maintain a natural hydrostatic pressure of sea water on the exterior surface of the membranes of said cells in excess of the hydrostatic head of any fresh water within said cells and collecting pipe section plus the natural osmotic pressure outwardly of the membranes resulting from differences in concentration of the solutions at the opposite surfaces of said membranes, conduit means communicating the hollow interior of said cells with the interior of said collecting pipe section, a pipe line extending from one end of said collecting pipe section to an outlet end above sea level for flow of extracted fresh water from said cells to the outlet end, lift means for lifting extracted fresh water from said collecting pipe section through said pipe line to the above surface location, and means for maintaining the interior of said cells open to substantially atmospheric pressure.

3. The apparatus of claim 2 wherein the osmotic membrane is cellulose acetate.

References Cited in the file of this patent

UNITED STATES PATENTS

| | | |
|---|---|---|
| 2,864,506 | Hiskey | Dec. 16, 1958 |
| 2,930,754 | Stuckey | Mar. 29, 1960 |
| 2,956,070 | Jennings | Oct. 11, 1960 |
| 3,060,119 | Carpenter | Oct. 23, 1962 |

FOREIGN PATENTS

| | | |
|---|---|---|
| 1,196,239 | France | May 25, 1959 |

OTHER REFERENCES

"Fresh Water from the Ocean," by Ellis, The Ronald Press Company, New York (1954), pages 104–109.

"The Minimum Energy Requirements for Sea Water Conversion Processes," by Murphy, The Office of Saline Water Research and Development, U.S. Department of the Interior (April 1956), pages 49 and 51.

"Separation and Purification," vol. III, Part I, Interscience Publishers, Inc., New York (1956), pages 711 to 721.